United States Patent
Sumida (10) Patent No.: US 6,184,783 B1
(45) Date of Patent: Feb. 6, 2001

(54) ELECTRONIC CONTROL UNIT FOR CAR

(75) Inventor: Yoshitaka Sumida, Nagoya (JP)

(73) Assignees: Harness System Technologies Research, Ltd., Nagoya; Sumitomo Wiring Systems, Ltd., Yokkaichi; Sumitomo Electric Industries, Ltd., Osaka, all of (JP)

(*) Notice: Under 35 U.S.C. 154(b), the term of this patent shall be extended for 0 days.

(21) Appl. No.: 09/140,465

(22) Filed: Aug. 26, 1998

(30) Foreign Application Priority Data

Oct. 14, 1997 (JP) .................................................. 9-280329

(51) Int. Cl.$^7$ ......................................................... B60Q 1/00
(52) U.S. Cl. ............................ 340/438; 340/635; 714/53; 714/55
(58) Field of Search ........................ 714/53, 55; 340/438, 340/635, 636

(56) References Cited

U.S. PATENT DOCUMENTS

| | | | |
|---|---|---|---|
| 4,538,273 | * 8/1985 | Lasser | 371/62 |
| 4,709,234 | * 11/1987 | Forehand et al. | 340/853.3 |
| 5,175,845 | * 12/1992 | Little | 395/550 |
| 5,359,515 | * 10/1994 | Weller et al. | 364/424.05 |
| 5,563,799 | * 10/1996 | Brehmer et al. | 364/481 |

FOREIGN PATENT DOCUMENTS 3-34955    4/1991   (JP).

* cited by examiner

*Primary Examiner*—Daniel J. Wu
(74) *Attorney, Agent, or Firm*—Oliff & Berridge, PLC (57) ABSTRACT

An electronic control unit for a car in which a control portion operates in accordance with signals given from a plurality of input portions including a car ignition switch to thereby perform drive control of a predetermined output portion, the control portion having a sleep function by which the control portion stops when the control portion in not required to operate, comprises a watchdog circuit for watching the operation of the control portion; and a conditioning circuit for defining a condition for starting the watchdog circuit; the conditioning circuit being constituted by an OR circuit for performing the logical sum OR among at least two signal inputs from the input portions and a signal input indicating the fact that the control portion is operating.

4 Claims, 8 Drawing Sheets

ELECTRONIC CONTROL UNIT FOR CAR

BACKGROUND OF THE INVENTION

The present invention relates to an electronic control unit for a car (hereinafter referred to a "car electric control unit").

Generally, a car electronic control unit is generally designed so as to be controlled by a microcomputer with the advance of its performance. In most cases, a car electronic control unit has such a circuit configuration in which the operation of the microcomputer is watched by a watchdog circuit for the purpose of fail safe at the time of running-away of a program in the microcomputer so that the microcomputer can be reset when the run-away state is detected.

Incidentally, a car electronic control unit generally has a function which stops such a microcomputer (that is, makes the microcomputer sleep) to thereby reduce consumed electric power when the microcomputer is not required to operate. However, if the microcomputer is made to sleep when the runaway state is watched by a built-in watchdog circuit, the electronic control unit resets the microcomputer to start on the basis of misjudgment that the microcomputer has stopped. That is, there arises a problem that the microcomputer starts to increase consumed electric power even in the case where the microcomputer is not required to operate. As a measure to solve such a problem, Japanese Utility Model Publication JP-3-34955(U) entitled "On-vehicle Appliance Control Circuit" proposes a circuit in which an electric source is supplied to a watchdog circuit only in the condition that the microcomputer is required to operate, for example, only when the ignition switch is in the on-state.

Figure 6:
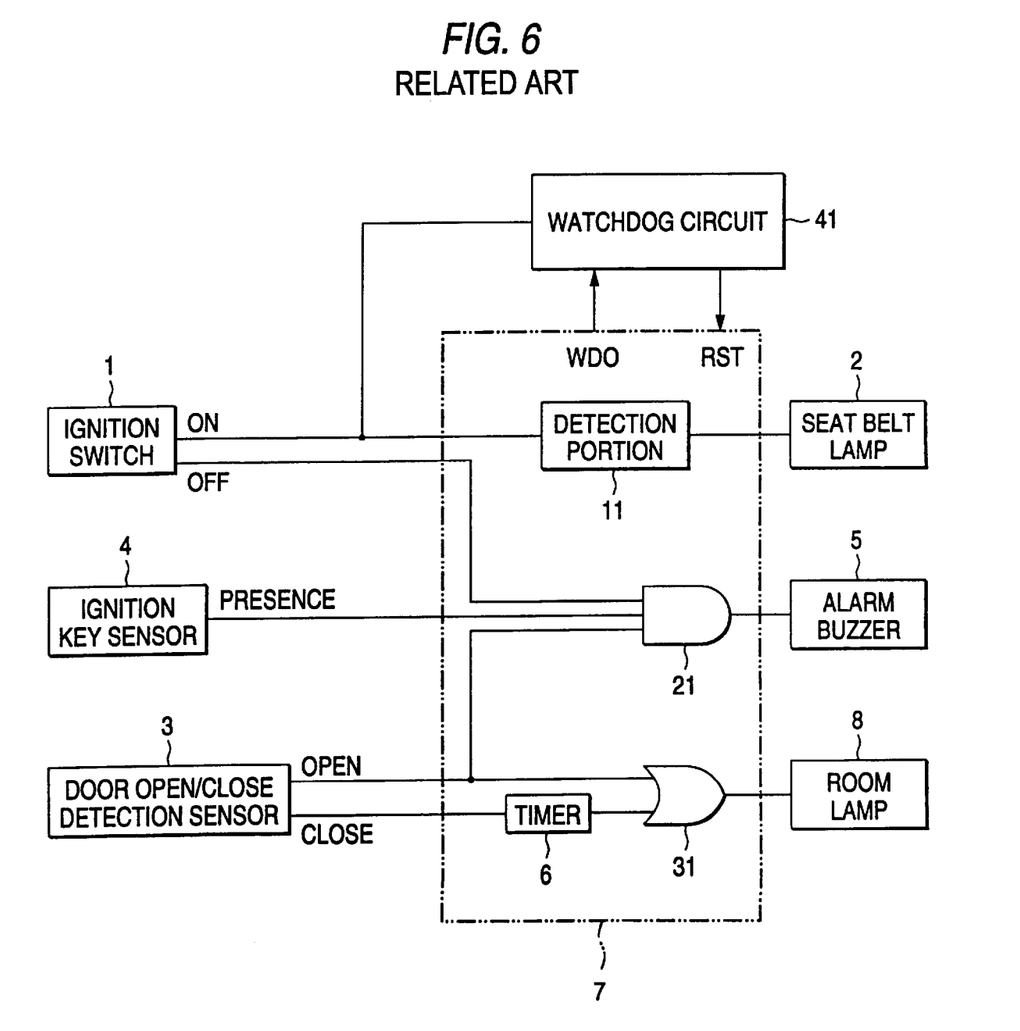
FIG. 6 is a functional block diagram showing operating functions of a conventional car electronic control unit.

FIG. 6 is a functional block diagram showing operating functions of the car electronic control unit. The car electronic control unit has three basic functions as follows:

a seat belt lamp control function which turns a seat belt lamp 2 on/off only when an ignition switch 1 is in an on-state;

a key alarm function which concludes that an ignition key is left behind and sounds an alarm buzzer 5 when an ignition key sensor 4 detects the fact that the ignition key is left as it is inserted in a key cylinder in spite of the fact that the ignition switch 1 is in an off-state and the opened-state of a driver's seat door is detected on the basis of a signal from the door open/close detection sensor 3; and a room lamp turning-on function which turns-on a room lamp 8 while the door is opened or for several seconds (for example, 5 seconds) after the door is closed on the basis of signals from the door open/close detection sensor 3 and a timer 6 connected to the door open/close detection sensor 3.

In addition to the above three basic functions, it has an additional function as follows.

A watchdog function which watches the operation, such as running-away, etc., of the control portion (microcomputer chip) 7 for controlling the operations of the aforementioned various functions.

Figure 7:
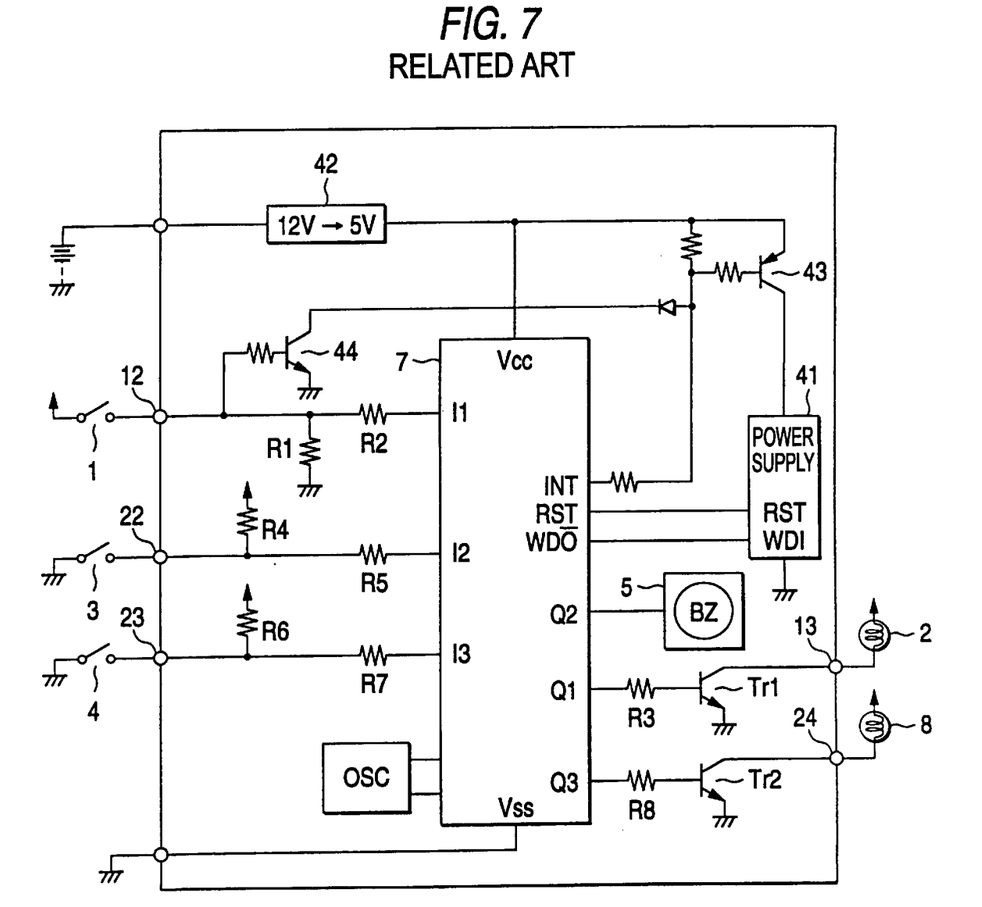
FIG. 7 is a circuit diagram showing the conventional car electronic control unit.

In the seat belt lamp control function, the on-state of the ignition switch 1 is detected by a detection portion 11 in the control portion 7 and the seat belt lamp 2 is controlled to be turned on/off on the basis of the result of the detection. Specifically, as shown in FIG. 7, the ignition switch 1 has one end connected to a battery and the other end connected to a connection terminal 12 of the car electronic control unit. The connection terminal 12 is grounded through a resistor R1 in the car electronic control unit and connected to a first input terminal I1 of the control portion 7 through a resistor R2. A first output terminal Q1 of the control portion 7 is

2 connected to the base of an NPN-type first transistor Tr1 through a resistor R3. The emitter of the first transistor Tr1 is grounded, and the collector of the first transistor Tr1 is connected to one end of the seat belt lamp 2 through a connection terminal I3. The other end of the seat belt lamp 2 is connected to the battery. A detection portion 11 in the control portion 7 performs on/off turning of the first transistor Tr1 in accordance with the input state of the first input terminal I1 to control the current in the seat belt lamp 2 to thereby control the turning on/off of the seat belt lamp 2.

In the key alarm function, as shown in FIG. 6, a logical product AND among the off-state of the ignition switch 1, the door opened-state detected by the door open/close detection sensor 3 and the key-presence state detected by the ignition key sensor 4 is detected by an AND circuit 21 to sound an alarm buzzer 5. Specifically, one end of the door open/close detection sensor 3 is grounded, and the other end of the door open/close detection sensor 3 is connected to a connection terminal 22 of the car electronic control unit. The connection terminal 22 is connected to the battery through a resistor R4 and connected to a second input terminal I2 of the control portion 7 through a resistor R5. Further, one end of the ignition key sensor 4 is grounded, and the other end of the ignition key sensor 4 is connected to a connection terminal 23 of the car electronic control unit. The connection terminal 23 is connected to the battery through a resistor R6 and connected to an input terminal I3 of the control portion 7 through a resistor R7. Further, a second output terminal Q2 of the control portion 7 is connected to the alarm buzzer 5. The logical product AND among the off-state of the ignition switch 1, the door opened-state detected by the door open/close detection sensor 3 and the key-presence state detected by the ignition key sensor 4 is detected by the AND circuit 21 in the control portion 7 to thereby control the sounding of the alarm buzzer 5.

In the room lamp turning-on function, as shown in FIG. 6, the timer 6 counts time for several seconds (for example, 5 seconds) after the door open/close detection sensor 3 detects the door closed-state so that the room lamp 8 is turned on while the door open/close detection sensor 3 detects the fact that the door is in the opened-state or while an AND circuit 31 logically detects the fact that the count value of the timer 6 is within the time of several seconds (5 seconds). Specifically, as shown in FIG. 7, a third output terminal Q3 of the control portion 7 is connected to the base of an NPN-type second transistor Tr2 through a resistor R8. The emitter of the second transistor Tr2 is grounded, and the collector of the second transistor Tr2 is connected to one end of the room lamp 8 through a connection terminal 24. The other end of the room lamp 8 is connected to the battery. The AND circuit 31 in the control portion 7 performs on/off turning of the second transistor Tr2 in accordance with the door opened/closed state to control the current in the room lamp 8 to thereby control the turning on/off of the room lamp 8.

In the watchdog function, as shown in FIG. 6, a watchdog circuit 41 is supplied with an electric source so as to operate when the ignition switch 1 is in the on-state. The watchdog circuit 41 receives a watchdog clear signal from a connection terminal WDO for reporting the internal operating state of the control portion 7, so that the watchdog circuit 41 watches the operation of the control portion 7 on the basis of the watchdog clear signal. When the operation of the control portion 7 gets into an abnormal state such as running-away, etc., the watchdog circuit 41 sends a reset signal to a reset terminal RST of the control portion 7. Specifically, as shown in FIG. 7, the watchdog circuit 41 is connected to a PNP-type transistor 43 (switching element) for switching the supply of a source current from an electric source (regulator) 42. The base of the transistor 43 is connected to an NPN-type transistor 44 the connection of which to the ground is switched on/off on the basis of the on/off state of the ignition switch 1.

Figure 8:
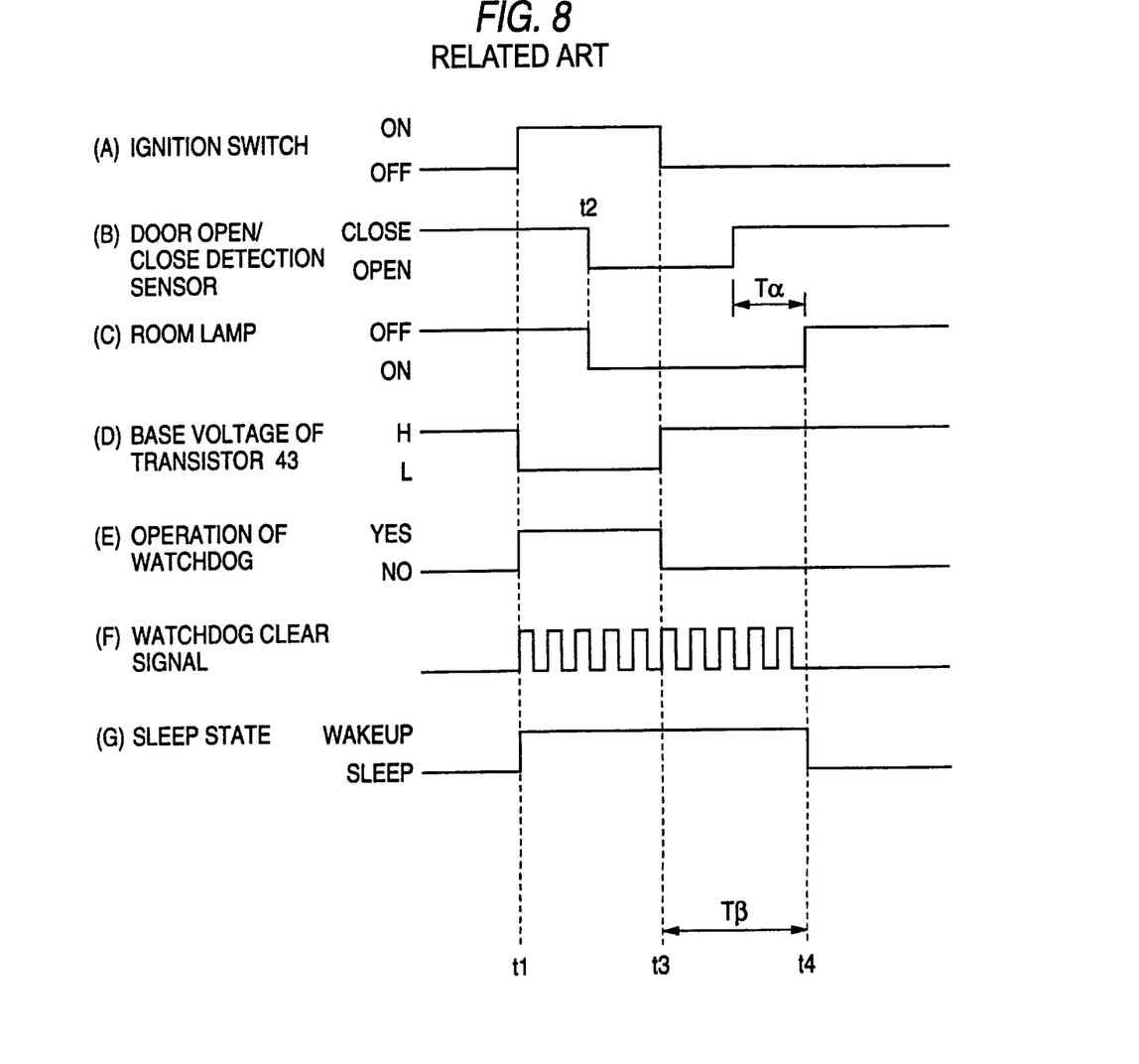
FIG. 8 is a timing chart showing operations of respective parts in the conventional car electronic control unit.

FIG. 8 is a timing chart showing operations of respective parts. In the car electronic control unit, when the ignition switch 1 is in an off-state in the waveform (A) in FIG. 8, the transistor 44 in FIG. 7 is in an off-state. Accordingly, the base of the transistor 43 becomes high as shown in the waveform (D) in FIG. 8, so that the transistor 43 is kept in the off-state. As a result, the watchdog circuit 41 is at a standstill because the electric source from the regulator 42 is not supplied to the watchdog circuit 41. Further, the control portion 7 is kept in the sleep state to avoid wasteful battery consumption.

When the ignition switch 1 is turned on (at time t1) in the waveform (A) in FIG. 8, the transistor 44 is turned on so that the base of the transistor 43 is bypassed to the ground side so as to become low as shown in the waveform (D) in FIG. 8. As a result, the transistor 43 is turned on, so that the electric source from the regulator 42 is supplied to the watchdog circuit 41. In this occasion, the watchdog circuit 41 sends a reset signal to the reset terminal RST of the control portion 7 to release the sleep state of the control portion 7 (to wake up the control portion 7) as shown in the waveform (G) in FIG. 8. At the same time, the watchdog circuit 41 starts a watchdog operation as shown in the waveform (E) in FIG. 8, so that the watchdog circuit 41 receives a watchdog clear signal as shown in the waveform (F) in FIG. 8 from the connection terminal WDO of the control portion 7 and watches the operation of the control portion 7 on the basis of the signal.

When, for example, a vehicle door is opened and the door opened-state is detected by the door open/close detection sensor 3 at time t2 (the waveform (B) in FIG. 8), the AND circuit 31 of the control portion 7 logically detects the door opened-state and turns on the room lamp 8 (the waveform (C) in FIG. 8).

Although it is a matter of course that the control portion 7 operates when the ignition switch 1 is in the on-state, the operation of the control portion 7 is not always stopped even in the case where the ignition switch 1 is turned off as will be described later. In this case, the watching function of the watchdog circuit 41 in the conventional car electronic control unit does not work when the ignition switch 1 is in an off-state. Accordingly, there arises a problem in a function, such as a timer function, etc., necessary for operating the microcomputer in the off-state of the ignition switch 1, such that running-away cannot be watched while the timer operates.

Specifically, when the ignition switch 1 is turned off as shown in the waveform (A) in FIG. 8 at time t3 in FIG. 8, the transistor 44 in FIG. 7 is turned off. Accordingly, the base of the transistor 43 becomes high as shown in the waveform (D) in FIG. 8, so that the transistor 43 is turned off. As a result, the electric source from the regulator 42 is not supplied to the watchdog circuit 41, so that the watchdog circuit 41 stops its watchdog operation (the waveform (E) in FIG. 8).

However, when the vehicle door is still opened after the time t3, the door opened-state is detected by the door open/close detection sensor 3 (the waveform (B) in FIG. 8). The timer 6 counts several seconds (5 seconds: Tα in the waveform (C) in FIG. 8) after the door open/close detection sensor 3 detects the door closed-state. The room lamp 8 must be in the on-state continuously unless the counting is completed. For this reason, the operation of the control portion 7 is continued even after the time t3 as shown in the waveform (G) in FIG. 8, so that the control portion 7 intends to give a watchdog clear signal, as shown in the waveform (F) in FIG. 8, to the watchdog circuit 41 through the connection terminal WDO.

However, because the watchdog operation of the watchdog circuit 41 has stopped at the time t3 as described above (the waveform (E) in FIG. 8), the watchdog circuit 41 cannot watch the control portion 7 in the period Tβ between the time t3 and the time t4 even in the case where the watchdog circuit 41 receives the watchdog clear signal as shown in the waveform (F) in FIG. 8.

SUMMARY OF THE INVENTION

Therefore, an object of the present invention is to provide a car electronic control unit in which a watchdog operation can be performed even in the off-state of an ignition switch as occasion demands.

In order to achieve the above object, according to an aspect of the present invention, provided is an electronic control unit for a car in which a control portion operates in accordance with signals given from a plurality of input portions including a car ignition switch to thereby perform drive control of a predetermined output portion, the control portion having a sleep function by which the control portion stops when the control portion in not required to operate, comprising: a watchdog circuit for watching the operation of the control portion; and a conditioning circuit for defining a condition for starting the watchdog circuit; the conditioning circuit being constituted by a logical sum OR circuit for performing logical sum OR among at least two signal inputs from the input portions and a signal input indicating the fact that the control portion is operating.

Preferably, the logical sum OR circuit acting as the conditioning circuit includes a switching element which is disposed in an electric source supply path for supplying an electric source to the watchdog circuit in a manner so that the switching element closes the electric source supply path only when the logical sum OR is detected among at least two signal inputs from the input portions and a signal input indicating the fact that the control portion is operating.

Preferably, the logical sum OR circuit acting as the conditioning circuit includes a function for supplying an operation-enabling signal to the watchdog circuit only when the logical sum OR is detected among at least two signal inputs from the input portions and a signal input indicating the fact that the control portion is operating.

Preferably, the input portions include at least an ignition switch, and a door open/close detection sensor; the output portion includes at least a room lamp for lighting up the inside of a car room; the control portion has a function so that the control portion operates to perform control to turn on the room lamp, regardless of the on/off state of the ignition switch, in a predetermined time after a door is closed/opened in accordance with a detection signal of the door open/close detection sensor; and signals given to the logical sum OR circuit acting as the conditioning circuit include an ON signal indicating the on-state of the ignition switch, an OPEN signal indicating the door opened-state from the door open/close detection sensor, and an operation confirmation signal indicating the fact that the control portion is operating, whereby the watchdog circuit executes watching on the operation of the control portion when at least one of the ON signal of the ignition switch, the OPEN signal of the door open/close detection sensor and the operation confirmation signal is inputted.

DETAILED DESCRIPTION OF THE PREFERRED EMBODIMENTS

First Embodiment

Figure 1:
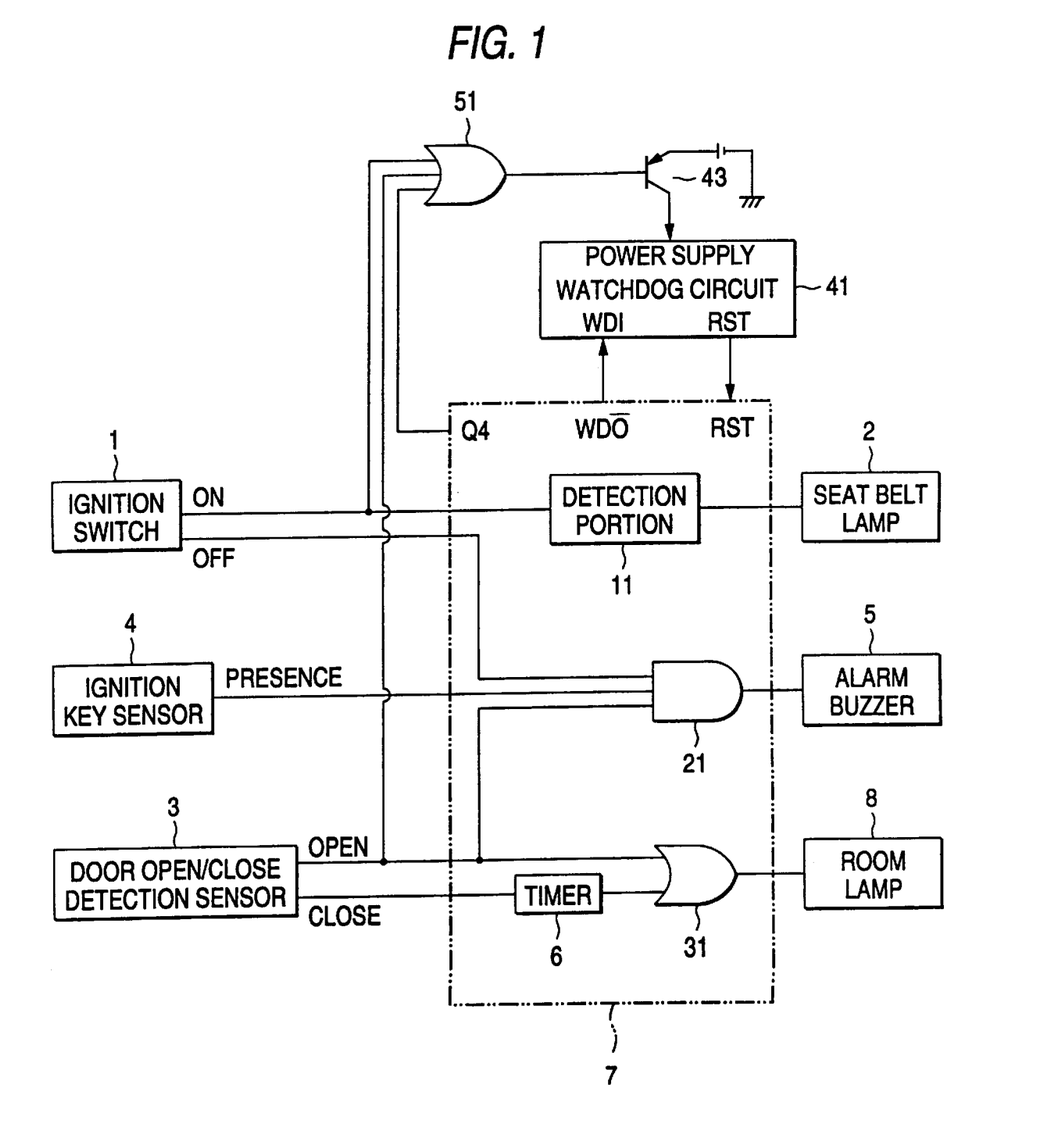
FIG. 1 is a functional block diagram showing operating functions of a car electronic control unit in a first embodiment of the present invention.

FIG. 1 is a diagram showing a first embodiment of the car electronic control unit according to the present invention. Incidentally, in FIG. 1, parts having the same functions as those in the conventional example described above with reference to FIGS. 6 through 8 are referenced correspondingly.

As shown in FIG. 1, the car electronic control unit of this embodiment is designed so that not only (i) the on-operation of an ignition switch 1 (the first event condition) but also the two conditions, namely, (ii) the detection of the door opened-state by a door open/close detection sensor 3 (the second event condition) and (iii) the operating state of a control portion 7 (the third event condition) are considered as conditions for supplying an electric source to a watchdog circuit 41. That is, a logical sum OR among those three conditions is detected by an OR circuit 51 (conditioning circuit) and used as a condition for supplying an electric source so that the watchdog circuit 41 starts when any one of those three event conditions is satisfied.

The specific configuration of this embodiment will be described below in detail with reference to FIG. 2. The ignition switch 1, the seat belt lamp 2, the door open/close detection sensor 3, the ignition key sensor 4, the alarm buzzer 5, the room lamp 8 and main functions (the timer 6, the detection portion 11, the AND circuit 21 and the OR circuit 31 in FIGS. 1 and 6) contained in the control portion 7 in this embodiment are the same as those in the conventional art. The duplicated description of the same configuration as in the conventional art will be avoided for convenience sake.

First, an electric source input portion of the watchdog circuit 41 is connected to the collector of a PNP-type transistor 43. The emitter of the transistor 43 is connected to a regulator 42 which is an electric source circuit. The base of the transistor 43 is connected to the collector of an NPN-type transistor 44 through a resistor R9 and a first diode D1 for preventing backflow. The base of the transistor 44 is connected to the ignition switch 1 through a resistor R10. Accordingly, the transistor 44 is turned on by the turning-on operation of the ignition switch 1, so that the first diode D1, the resistor R9 and the base of the transistor 43 are grounded through the on-state transistor 44. As a result, the transistor 43 is turned on so that a source current from the regulator 42 is supplied to the watchdog circuit 41. That is, the first diode D1 and the transistor 44 constitute a first bypass circuit 52 for grounding the resistor R9 and the base of the transistor 43.

A second bypass circuit 53 connected to the door open/close detection sensor 3 through a second diode D2 for preventing backflow and a connection terminal 22 is connected to a junction point A between the resistor R9 and the first diode D1. When the door open/close detection sensor 3 is in an on-state (closed-state), the opposite ends of the door open/close detection sensor 3 are grounded, that is, the junction point A between the second bypass circuit 53 (second diode D2) and the resistor R9 is grounded. As a result, the transistor 43 is turned on, so that a source current from the regulator 42 is supplied to the watchdog circuit 41.

Further, an operation confirmation output terminal Q4 for reporting whether the control portion 7 is operating or not, is formed in the control portion 7. The operation confirmation output terminal Q4 is connected to the base of an NPN-type transistor 54 through a resistor R11. The emitter of the transistor 54 is grounded. The collector of the transistor 54 is connected to the junction point A between the resistor R9 and the first and second diodes D1 and D2 through a third diode D3 for preventing backflow. The third diode D3 and the transistor 54 constitute a third bypass circuit 55 for grounding the resistor R9 and the base of the transistor 43. That is, when the control portion 7 is operating, a high level signal is outputted from the operation confirmation output terminal Q4 to turn on the transistor 54 to thereby ground the resistor R9 and the base of the transistor 43 through the transistor 54. As a result, the transistor 43 is turned on, so that a source current from the regulator 42 is supplied to the watchdog circuit 41. Further, a resistor R12 is interposed between the regulator 42 and the junction point A.

As described above, the plurality of bypass circuits 52, 53 and 55 are connected in parallel with one another to thereby form the aforementioned OR circuit 51.

Figure 2:
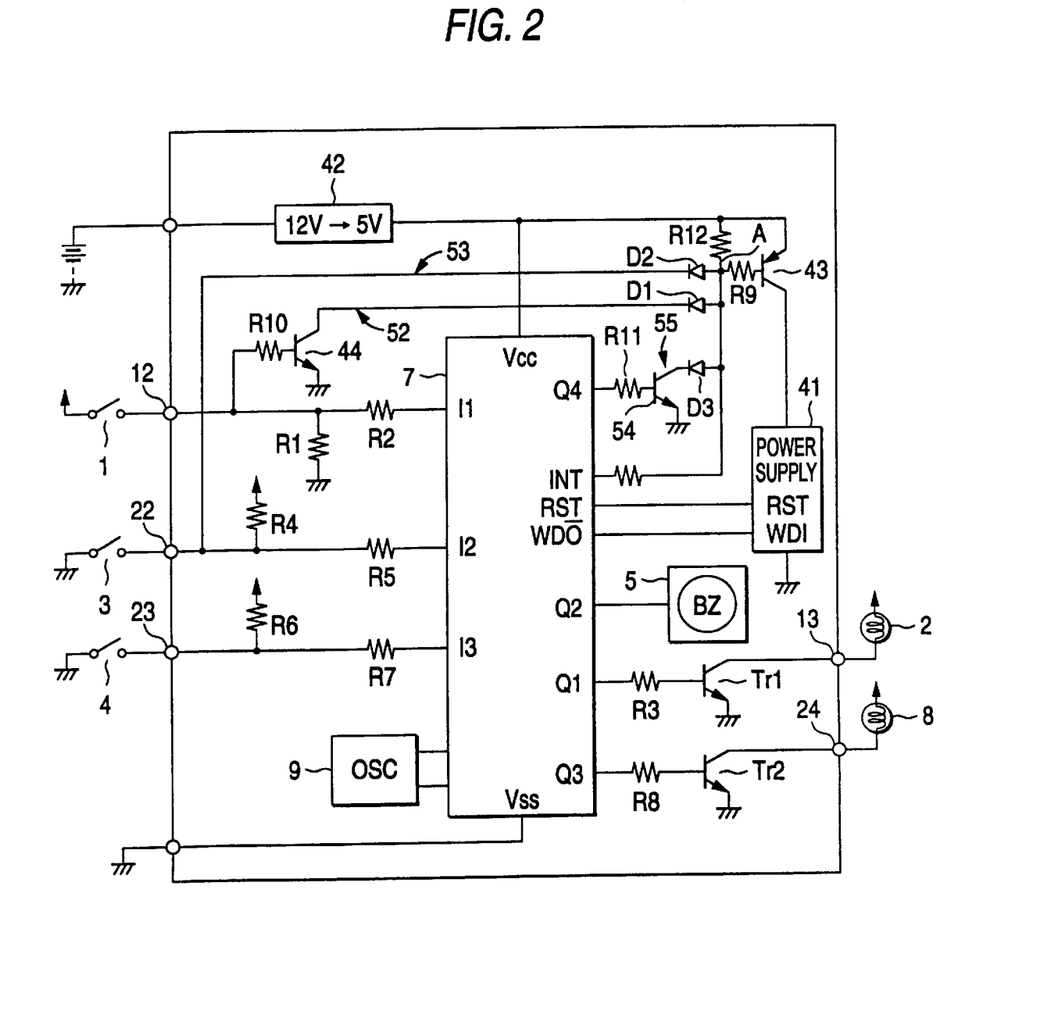
FIG. 2 is a circuit diagram showing the car electronic control unit in the first embodiment of the present invention.

In FIG. 2, the reference numeral 9 designates an oscillation circuit for generating a clock signal to define operation timing in the control portion 7, and the reference character INT designates an interrupt input terminal for performing an interrupt process in the control portion 7.

The constituent parts other than the aforementioned parts are the same as those described above in the conventional art with reference to FIGS. 6 and 7. Accordingly, the description of those other constituent parts will be omitted here.

Figure 3:
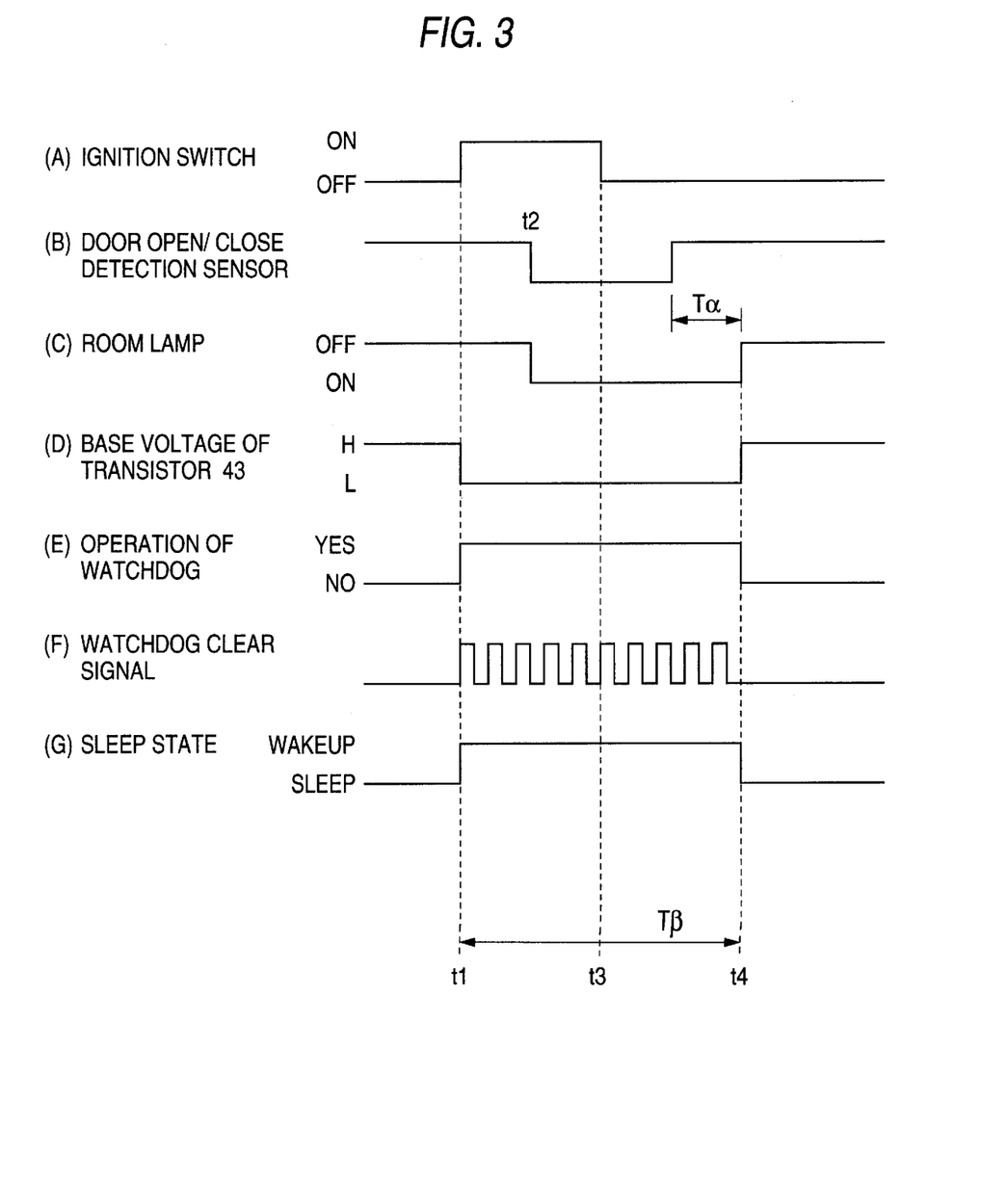
FIG. 3 is a timing chart showing operations of respective parts in the car electronic control unit in the first embodiment of the present invention.

The operations of various parts in the car electronic control unit configured as described above will be described below with reference to FIG. 3 which is a timing chart. First, when the ignition switch 1 in the waveform (A) in FIG. 3 is in the off-state, the transistor 44 in FIG. 2 is in the off-state. Accordingly, the base of the transistor 43 is high as shown in the waveform (D) in FIG. 3, so that the transistor 43 is kept in the off-state. Accordingly, the electric source from the regulator 42 is not supplied to the watchdog circuit 41, so that the watchdog circuit 41 is at a standstill. Further, the control portion 7 is kept in the sleep state (the waveform (G) in FIG. 3) in order to avoid wasteful battery consumption.

When the ignition switch 1 in the waveform (A) in FIG. 3 is then turned on (at time t1), the base of the transistor 43 is bypassed to the ground and becomes low as shown in the waveform (D) in FIG. 3 because of the on-operation of the transistor 44 in the first bypass circuit 52. As a result, the transistor 43 is turned on, so that the electric source from the regulator 42 is supplied to the watchdog circuit 41. In this occasion, the watchdog circuit 41 sends a reset signal to the reset terminal RST of the control portion 7 to release the sleep state of the control portion 7 (to wake up the control portion 7) as shown in the waveform (G) in FIG. 3. At the same time, the watchdog circuit 41 starts a watchdog operation as shown in the waveform (E) in FIG. 3, so that the watchdog circuit 41 receives a watchdog clear signal as shown in the waveform (F) in FIG. 3 from the connection terminal WDO of the control portion 7 and watches the operation of the control portion 7 on the basis of the watchdog clear signal.

When, for example, a vehicle door is opened and the door opened-state is detected by the door open/close detection sensor 3 at time t2 (the waveform (B) in FIG. 3), the connection terminal 22 connected to the door open/close detection sensor 3 becomes low because one end of the door open/close detection sensor 3 is grounded. The OR circuit 31 logically detects the low state of the connection terminal 22 to turn on the room lamp 8 (the waveform (C) in FIG. 3). At the same time, also the second bypass circuit 53 connected to the connection terminal 22 becomes low.

When the ignition switch 1 is then turned off at time t3 as shown in the waveform (A) in FIG. 3, the transistor 44 in FIG. 2 is turned off. Accordingly, the on-operation instruction (low level signal) given to the base of the transistor 43 through the first bypass circuit 52 is released. However, in the case where the vehicle door is kept in the opened-state after that point of time, the second bypass circuit 53 connected to the connection terminal 22 is kept low because the door opened-state is continuously detected by the door open/close detection sensor 3 (the waveform (B) in FIG. 3). As a result, the junction point A between the second bypass circuit 53 and the resistor R9 is kept low.

At the same time, the control portion 7 is in the operating state regardless of the on/off state of the ignition switch 1 while the control portion 7 detects the fact that the door open/close detection sensor 3 is in the on-state. This operating state of the control portion 7 is given from the operation confirmation output terminal Q4 to the third bypass circuit 55 so that the transistor 54 is turned on to thereby keep the junction point A between the third bypass circuit 55 and the resistor R9 low.

Because the junction point A is kept low in the aforementioned manner, the transistor 43 is kept in the on-state as shown in the waveform (D) in FIG. 3. Accordingly, the electric source from the regulator 42 is continuously supplied to the watchdog circuit 41. As a result, the watchdog circuit 41 receives a watchdog clear signal as shown in the waveform (F) in FIG. 3 from the connection terminal WDO of the control portion 7 and watches the operation of the control portion 7 on the basis of the watchdog clear signal.

Here, after the time t3, if the vehicle door is closed and the door closed-state is detected by the door open/close detection sensor 3, the grounded-state of the second bypass circuit 53 is released. However, because the control portion 7 continues its operation until the timer 6 has counted several seconds (5 seconds: Tα in the waveform (C) in FIG. 3), the on-state of the transistor 54 is continued and the junction point A is grounded through the third bypass circuit 55. Accordingly, as shown in FIG. 2, the on-state of the transistor 43 is kept, and the electric source from the regulator 42 is continuously supplied to the watchdog circuit 41, so that the watchdog circuit 41 watches the operation of the control portion 7 while receiving such a watchdog clear signal as shown in the waveform (F) in FIG. 3 from the connection terminal WDO of the control portion 7.

At the point of time (time t4) when the timer 6 has counted the several seconds (5 seconds: Tα in the waveform (C) in FIG. 3) 6 after the detection of the door closed-state by the door open/close detection sensor 3, the state of the control portion 7 is switched to the sleep state in order to avoid wasteful battery consumption. As a result, also the watchdog clear signal from the connection terminal WDO stops (the waveform (F) in FIG. 3). At this point of time, the output from the operation confirmation output terminal Q4 of the control portion 7 stops, so that the transistor 54 is turned off to release the grounded-state of the third bypass circuit 55. Because all the grounded-states of the first, second and third bypass circuits 52, 53 and 55 are released in the aforementioned manner, the electric potential of the regulator 42 is directly given to the junction point A through the resistor R12. As a result, the level of the junction point A becomes high, so that the transistor 43 is turned off to stop supply of the electric source to the watchdog circuit 41.

When the presence/absence of the ignition key is detected by the ignition key sensor 4, it is not necessary to perform delayed control by the timer 6 though such delayed control is necessary in the case where the room lamp 8 is controlled on the basis of the detection performed by the door open/close detection sensor 3. Because the control portion 7 operates surely at least when the ignition key sensor 4 is in the on-state (that is, when the key is present), the operation of the watchdog circuit 41 can be controlled sufficiently by a simple operation in which the third bypass circuit 55 is grounded in accordance with the output signal from the operation confirmation output terminal Q4 of the control portion 7.

As described above, not only the operation of the control portion 7 can be watched by the watchdog circuit 41 while any one of the seat belt lamp control function, the key forgotten state alarm function and the room lamp turning-on function in the control portion 7 operates but also the watchdog circuit 41 can be stopped soon to avoid wasteful battery consumption when none of the aforementioned functions operates. That is, a watchdog operation can be performed as occasion demands. The reliability of the car electronic control unit can be improved.

Incidentally, the condition for starting the watchdog circuit 41 may be limited to the fact that the control portion 7 is operating. In this case, however, the watchdog circuit 41 starts only when an output appears from the operation confirmation output terminal Q4 after the control portion 7 operates. Accordingly, delay time corresponding to at least several clock pulses is generated between the start of the control portion 7 and the start of the watchdog circuit 41. On the contrary, if either one of a switch (1) and a sensor (3) which may be a cause of the start of the control portion 7 is used as the condition for starting the watchdog circuit 41 as described in this embodiment of the present invention, there arises an advantage that the point of time of starting the watchdog circuit 41 can be prevented from being delayed from the point of time of starting the control portion 7.

Second Embodiment

Figure 4:
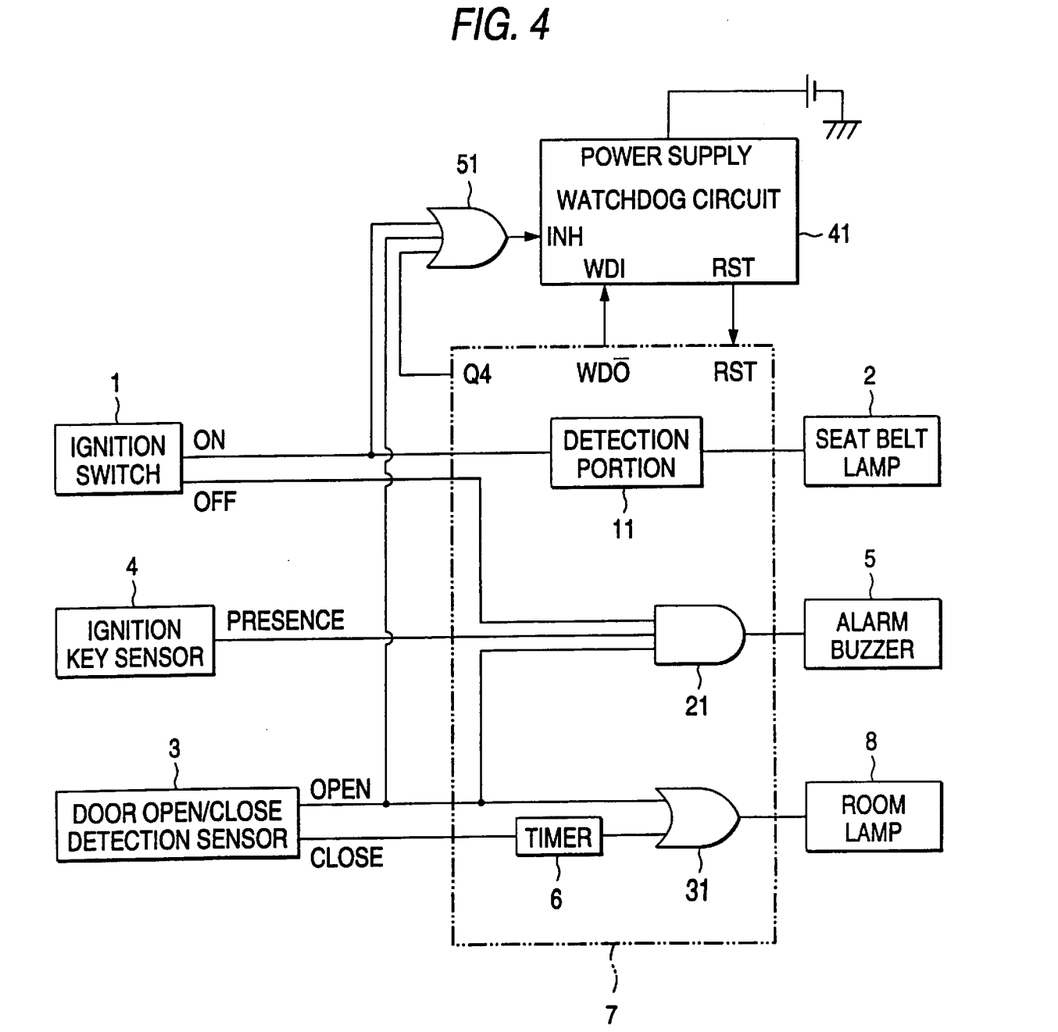
FIG. 4 is a functional block diagram showing operating functions of a car electronic control unit in a second embodiment of the present invention.
Figure 5:
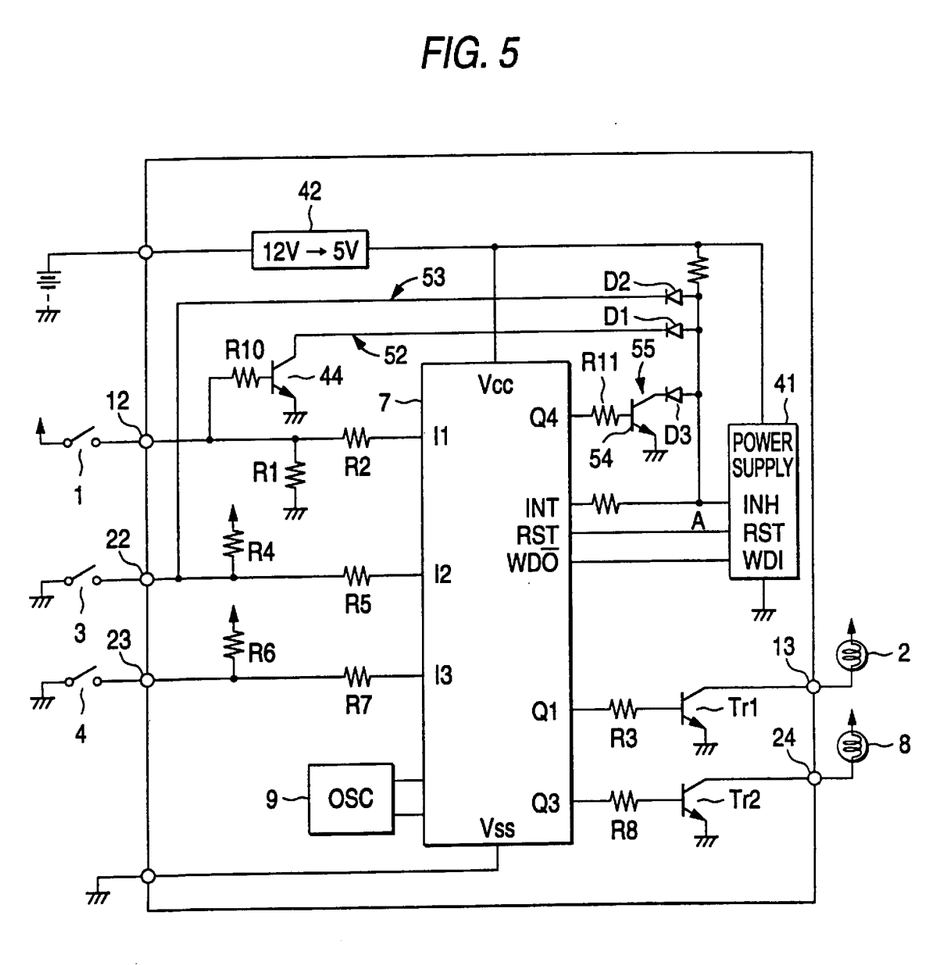
FIG. 5 is a circuit diagram showing the car electronic control unit in the second embodiment of the present invention.

FIG. 4 is a functional block diagram showing the operating functions of a car electronic control unit according to a second embodiment of the present invention. FIG. 5 is a circuit diagram of the car electronic control unit. Incidentally, in FIGS. 4 and 5, parts having the same functions as those described in the first embodiment of FIGS. 1 and 2 as well as those described in the conventional art with reference to FIGS. 6 and 7 are referenced correspondingly.

In the first embodiment or in the conventional art, a transistor 43 is interposed in a path of electric source supply to the watchdog circuit 41 and it is turned on/off to thereby switch the start/stop state of the watchdog circuit 41. In the car electronic control unit in this embodiment, on the other hand, as shown in FIGS. 4 and 5, switching is not performed in the electric source path but an inhibition terminal INH for inputting an inhibition signal for setting an enabling/disabling state of a run-away watching function is provided in the watchdog circuit 41 so that an OR circuit 51 which is the same as in the first embodiment is provided in an input circuit to the inhibition terminal INH. The OR circuit 51 is constituted by a plurality of bypass circuits 52, 53 and 55 connected in parallel with one another in the same manner as in the first embodiment.

Because a source current from the regulator 42 can be supplied directly to the watchdog circuit 41, the transistor 43 connected to the regulator 42 in the first embodiment and the resistor R9 connected to the base of the transistor 43 are omitted in this second embodiment.

Although this embodiment has shown the case where the alarm buzzer 5 is omitted, it is a matter of course that the alarm buzzer 5 may be provided in the same manner as in the first embodiment.

According to this embodiment, the run-away watching function of the watchdog circuit 41 is set to an enabling/disabling state in accordance with the level low/high of the electric potential at the junction point A. Accordingly, the same effect as in the first embodiment can be obtained when the same operation as in the first embodiment is carried out as shown in the timing chart of FIG. 3. In addition, a simpler circuit configuration can be achieved compared with the first embodiment because the electric source control transistor 43 becomes unnecessary in the second embodiment.

Although the embodiments have been described about a car electronic control unit having a seat belt lamp control function, a key forgotten state alarm function and a room lamp turning-on function by way of example, it is a matter of course that the invention can be applied to any unit so long as the unit has functions of collectively controlling and managing electrical attachment parts, such as a car power window control function, a remote door unlock control function, etc.

According to an aspect of the present invention, the watchdog circuit is started under the condition that the control portion is operating or signals are inputted from at least two input portions which are the cause of starting of the control portion. Accordingly, for example, even in the case where the ignition switch is in an off-state, the operation of the control portion can be watched by the watchdog circuit as occasion demands. Accordingly, the reliability of the car electronic control unit can be improved. Furthermore, when none of the aforementioned conditions is satisfied, the watchdog circuit can be stopped soon to avoid wasteful battery consumption.

Further, because not only the operating state of the control portion but also the signal input state from the input portions is used as a condition, the point of time of starting the watchdog circuit can be prevented from being delayed from the point of time of starting the control portion.

According to another aspect of the present invention, a switching element is provided in an OR circuit as a conditioning circuit so that electric source supply to the watchdog circuit is switched by the switching element. Accordingly, when the watchdog circuit is at a standstill, the electric source supply to the watchdog circuit can be cut off perfectly to reduce wastefully consumed electric power.

According to a further aspect of the present invention, the switching element stated in the above aspect can be omitted from the electric source supply path. Accordingly, there arises an effect that circuit configuration in the electric source supply path can be made simple.

What is claimed is:

1. An electronic control unit for a car comprising:
   a control portion which operates in accordance with signals given from a plurality of input portions including a car ignition switch to perform drive control of a predetermined output portion, said control portion stops when said control portion in not required to operate, said control portion including an operation confirmation output terminal (Q4) from which a signal input indicating the fact that said control portion is operating is output;
   a watchdog circuit for watching the operation of said control portion; and
   a logical sum circuit for detecting a logical sum among at least two signal inputs from said input portions and the signal input indicating the fact that said control portion is in operating, which is output from said operation confirmation output terminal (Q4),
   wherein said watchdog circuit is operated while said logical sum is detected by said logical sum circuit.

2. An electronic control unit as claimed in claim 1, wherein a switching element is provided in a power supply path to the watchdog circuit, and
   when said logical sum circuit detects the logical sum at least two signal inputs from said input portions and a signal input indicating the fact that said control portion is in operating, which is output from said operation confirmation output terminal (Q4), said switching element is driven to close said power supply path to the watchdog circuit whereby the watchdog circuit is started.

3. An electronic control unit as claimed in claim 1, wherein said watchdog circuit has an inhibit terminal (INH) to which an inhibit signal for setting enable/disable of run-out monitoring function is input; and
   while said logical sum circuit detects the logical sum at least two signal inputs from said input portions and a signal input indicating the fact that said control portion is in operating, which is output from said operation confirmation output terminal (Q4), said switching element is driven to close said power supply path to the watchdog circuit whereby the watchdog circuit is started, said logical sum circuit supplies an operation enabling signal to the inhibit terminal (INH) of the watchdog circuit.

4. An electronic control unit as claimed in claim 1, wherein said input portions include at least an ignition switch and a door open/close detection sensor;
   said output portion includes at least a room lamp for lighting up the inside of a car room;
   said control portion has a function so that said control portion operates to perform control to turn on said room lamp, regardless of the on/off state of said ignition switch, in a predetermined time after a door is closed/opened in accordance with a detection signal of said door open/close detection sensor; and
   signals given to said logical sum include an ON signal indicating the on-state of said ignition switch, an OPEN signal indicating the door opened-state from said door open/close detection sensor, and an operation confirmation signal indicating the fact that said control portion is operating, whereby said watchdog circuit executes watching on the operation of said control portion when at least one of said ON signal of said ignition switch, said OPEN signal of said door open/close detection sensor and said operation confirmation signal is inputted.

* * * * *